(12) United States Patent
Erden et al.

(10) Patent No.: US 9,105,302 B1
(45) Date of Patent: Aug. 11, 2015

(54) READING NARROW DATA TRACKS WITH MULTIPLE WIDE READERS

(71) Applicant: Seagate Technology LLC, Cupertino, CA (US)

(72) Inventors: Mehmet Fatih Erden, St. Louis Park, MN (US); Jason Charles Jury, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/446,047

(22) Filed: Jul. 29, 2014

(51) Int. Cl.
*G11B 20/10* (2006.01)
*G11B 5/48* (2006.01)

(52) U.S. Cl.
CPC ........ *G11B 20/10268* (2013.01); *G11B 5/4886* (2013.01)

(58) Field of Classification Search
None
See application file for complete search history.

(56) References Cited

U.S. PATENT DOCUMENTS

| | | | |
|---|---|---|---|
| 7,259,927 B2 | 8/2007 | Harris | |
| 7,982,994 B1 | 7/2011 | Erden et al. | |
| 8,139,301 B1 | 3/2012 | Li et al. | |
| 8,599,508 B1 * | 12/2013 | Burd | 360/39 |
| 8,711,517 B2 | 4/2014 | Erden et al. | |
| 2005/0036437 A1 * | 2/2005 | Learned et al. | 369/124.02 |
| 2013/0250447 A1 * | 9/2013 | Erden | 360/51 |
| 2013/0286511 A1 | 10/2013 | Edelman et al. | |
| 2014/0043708 A1 * | 2/2014 | Erden et al. | 360/39 |
| 2014/0063644 A1 | 3/2014 | Lou et al. | |
| 2014/0139940 A1 * | 5/2014 | Ong et al. | 360/39 |
| 2014/0160590 A1 * | 6/2014 | Sankaranarayanan et al. | 360/45 |

* cited by examiner

*Primary Examiner* — Paul Huber
(74) *Attorney, Agent, or Firm* — Taylor English Duma, LLP

(57) ABSTRACT

Technologies are described herein for utilizing multiple, wide readers to read narrow data tracks on a magnetic recording media in a storage device. A system for reading a data track on a magnetic recording media comprises a plurality of reader elements and a multi-reader decoder module operably connected to the plurality of reader elements. Each of the reader elements is configured to read a magnetic signal from the magnetic recording media. Each reader element may be wider than a width of the data track on the recording media. The multi-reader decoder module is configured to receive a read signal from each of the reader elements, and decode the data on the data track based on the read signals from the reader elements.

15 Claims, 6 Drawing Sheets

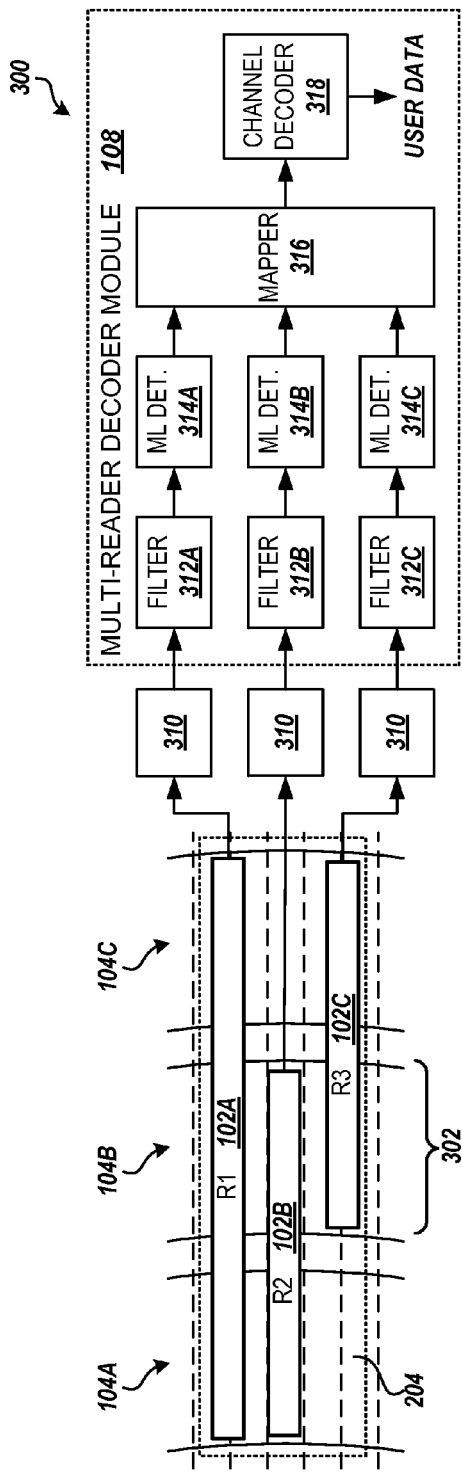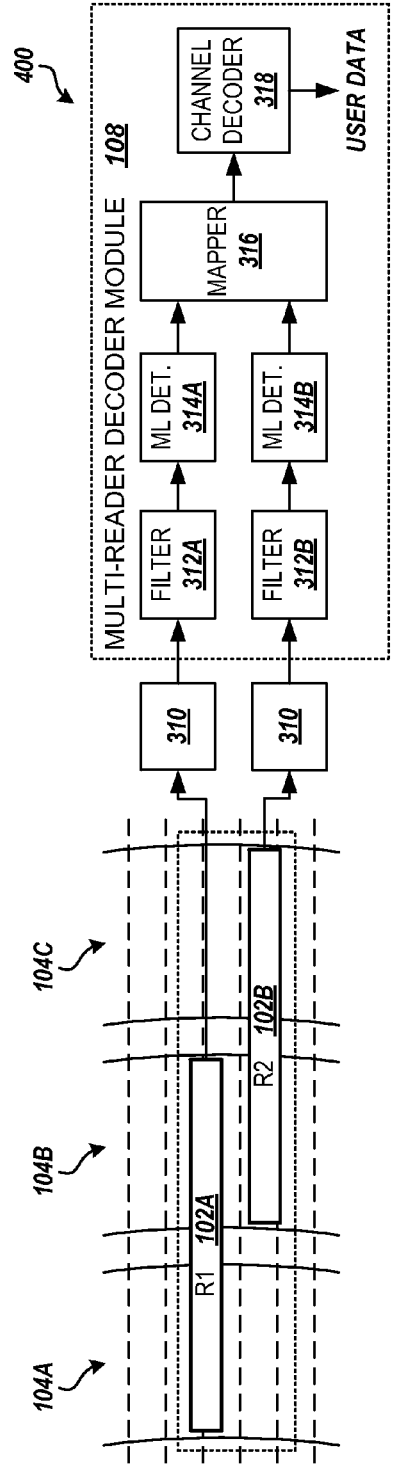
FIG. 3
FIG. 4

READING NARROW DATA TRACKS WITH MULTIPLE WIDE READERS

BRIEF SUMMARY

The present disclosure relates to technologies for utilizing multiple, wide readers to read narrow data tracks on a magnetic recording media, such as that in a hard-disk drive ("HDD") device. According to some embodiments, a system for reading a data track on a magnetic recording medium comprises a plurality of reader elements and a multi-reader decoder module operably connected to the plurality of reader elements. Each of the reader elements is configured to read a magnetic signal from the magnetic recording media. Each reader element may be wider than a width of the data track on the recording media. The multi-reader decoder module is configured to receive a read signal from each of the reader elements, and decode the data on the data track based on the read signals from the reader elements.

According to further embodiments, a method for reading a target data track on a recording media comprises receiving a read signal from each of a plurality of reader elements, the read signal indicating a summation of data on the target data track and one or more adjacent tracks. At least one of the plurality of reader elements is wider than the target data track on the recording media. The data on the target track is then determined based on the read signals from the plurality of reader elements.

According to further embodiments, a read/write channel of an HDD device comprises a plurality of multi-level detectors and a mapper. Each of the multi-level detectors is configured to detect multiple levels in read signals from a plurality of reader elements and generate an associated multi-level value. At least one of the plurality of reader elements is wider than data tracks written to a recording media of the HDD device. The mapper is configured to convert the multi-level values from the plurality of multilevel detectors to bit data stored on a target data track on the recording media.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

FIGS. 3-6 are block diagrams showing aspects of systems for reading a data track on a magnetic media utilizing multiple, wide readers, according to embodiments described herein.

DETAILED DESCRIPTION

The following detailed description is directed to technologies for utilizing multiple, wide readers to read narrow data tracks on a magnetic recording media. A typical storage device may include a hard-disk drive ("HDD") device. The HDD device may contain a number of magnetic storage disks that include a number of concentric data tracks containing the data stored on the device. As the storage capacity of HDD devices increase, the areal density capability ("ADC") of the storage disks may also increase. The ADC of a storage disk has two main components: the number of bits of data that can be squeezed on the disks in along-track direction, measured in bits-per-inch ("BPI"), and the number of data tracks squeezed into a cross-track direction, measured in tracks-per-inch ("TPI"). The ADC may be expressed as the multiplication of BPI and TPI Perpendicular magnetic recording ("PMR") technology used widely in HDD devices is approaching its superparamagnetic limit at existing storage densities, which restricts device manufactures from increasing ADC of the storage disks. In addition, alternative recording technologies to the existing PMR technology favor higher TPI more than PMR technology. For example, Shingled Magnetic Recording ("SMR") by design writes narrower tracks. Heat-assisted magnetic recording ("HAMR") light sources also naturally favor high TPI designs, which mean narrower data tracks. Bit-pattern media ("BPM") dots also prefer to be closer to each other for both along-track and cross-track directions.

Reader width scaling represents a major challenge to high TPI designs in the recording media of HDD devices. The design of readers narrow enough to fit into the narrow tracks so that they do not read interference from adjacent tracks without losing their required reader signal-to-noise ratio ("SNR") is difficult and readers meeting these requirements may be expensive. According to the embodiments described herein, storage device systems, apparatus, and methods may be implemented to handle high TPI media with multiple readers much wider than the data track width. These systems may use existing reader designs instead of requiring a new design for a single, very narrow reader. In addition, these multiple-reader systems may be utilized with conventional writing techniques. These systems may also be utilized with systems have existing media design, where the reader width is more comparable to the written track width, as will be described herein.

Figure 1:
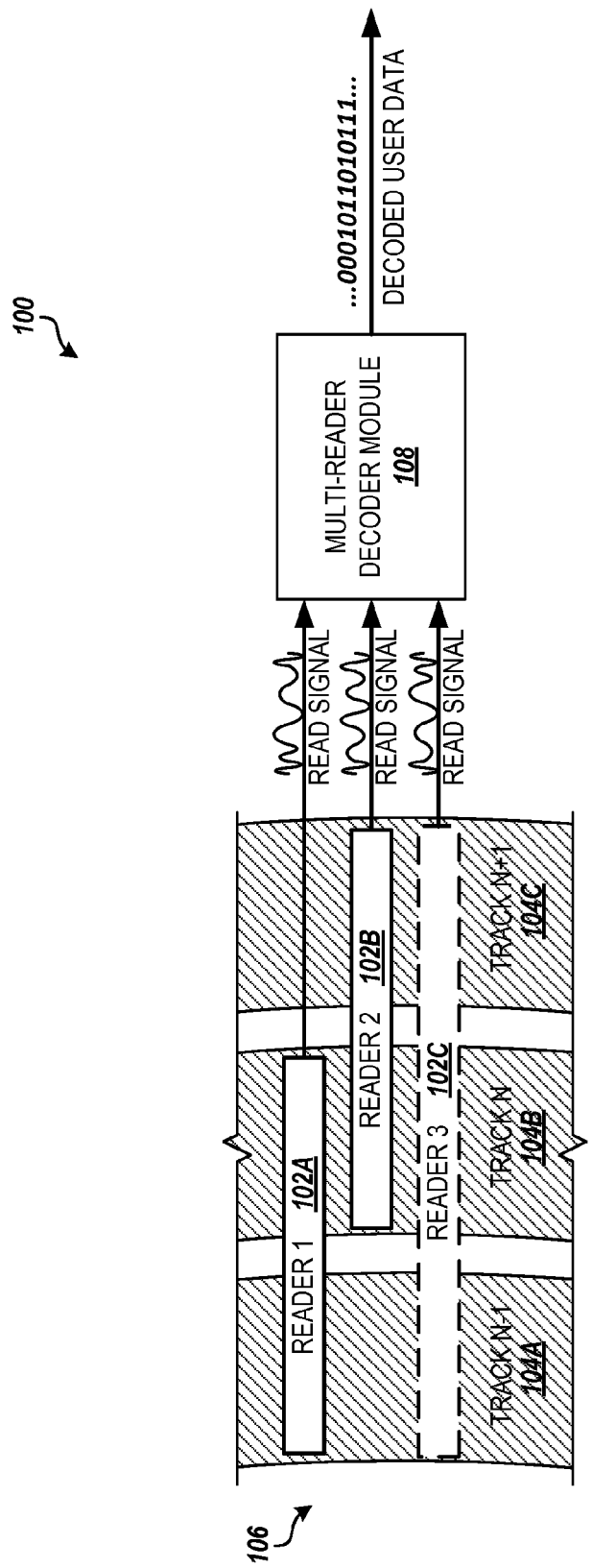
FIG. 1 is a block diagram showing a system for reading a data track on a magnetic media utilizing multiple, wide readers, according to embodiments described herein.

FIG. 1 provides an overview of an illustrative system 100 that utilizes multiple, wide readers to read narrow data tracks on a magnetic recording media of a storage device, according to the embodiments described herein. The system 100 comprises multiple reader elements 102A-102C (referred to herein generally as reader element 102). The reader elements 102 may represent magneto-resistive ("MR") readers on a read/write head of the storage device, for example. As may be seen in the figure, each of the reader elements 102, in this embodiment is much wider than the width of the data tracks 104A-104C (referred to herein generally as data track 104) written to the recording media 106. A reader that is significantly wider than the width of the data tracks 104 written to the media, such as reader element 102A, makes conventional recording/reading methods difficult because the reader will read a lot of interference from adjacent tracks. Instead, the system of FIG. 1 utilizes two reader elements 102A and 102B that are as wide as 2× the written track width. The system may optionally utilize a third reader 102C that is 3× the written track width.

The system 100 further comprises a multi-reader decoder module 108. The multi-reader decoder module 108 may comprise components and/or software in the controller of the storage device. As will be described in more detail below, during a read operation of the storage device, the multi-reader decoder module 108 receives the read signals from the multiple reader elements 102 in order to detect multiple levels under each reader. The multi-reader decoder module 108 may then utilize the detected levels to decode the bits of data written to a target data track of the read operation, such as data track N 104B. In this fashion, by using multiple readers much wider than the written data tracks, the system can still resolve one narrow track. According to embodiments, the storage device may employ existing reader design to read the narrow data tracks 104 of high TPI media, thus reducing the design costs associated with producing a narrow reading element. In addition, conventional write processes may be utilized in the storage device, further reducing the costs of implementation.

Figure 2:
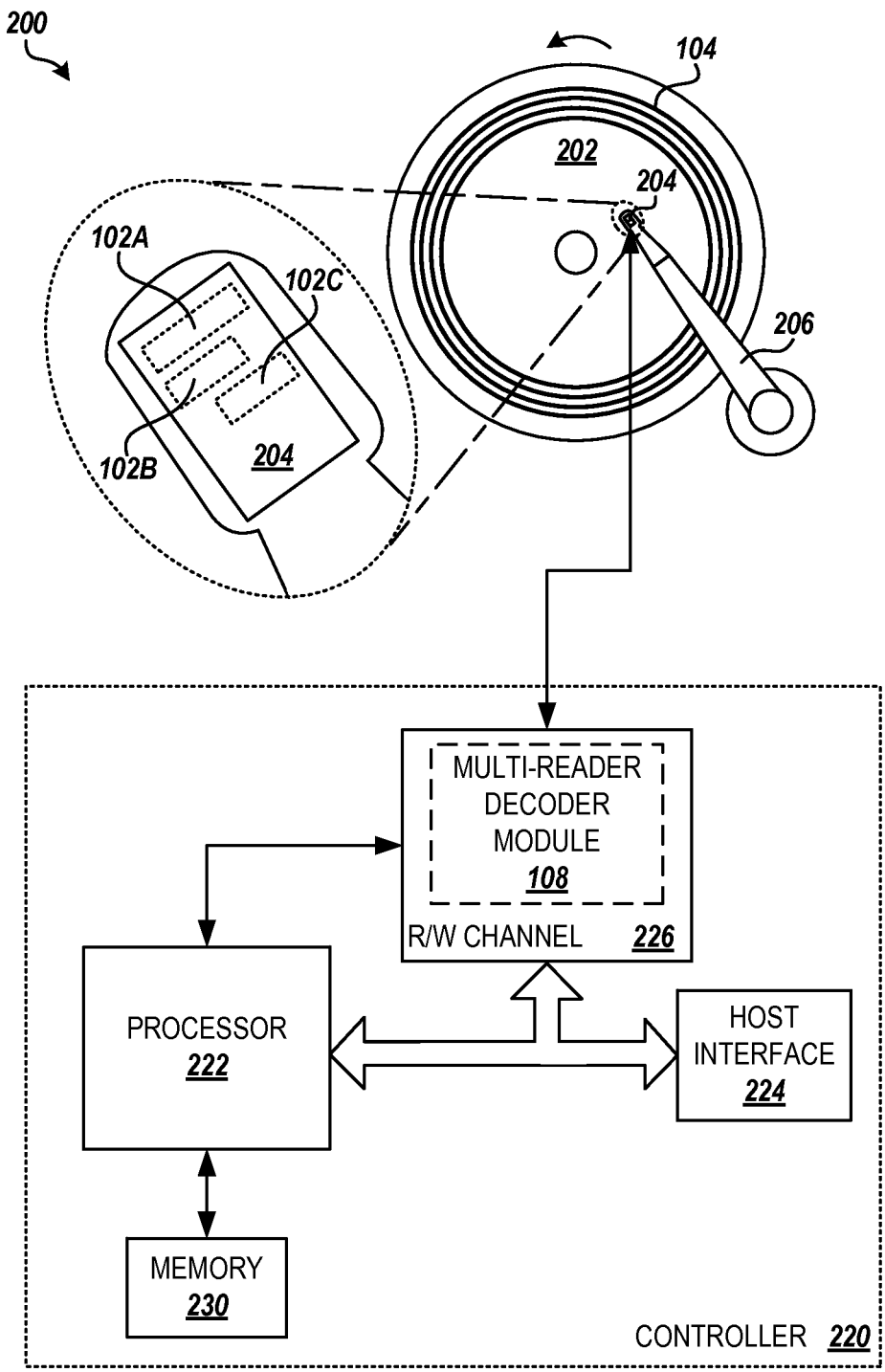
FIG. 2 is a block diagram showing an illustrative environment for utilizing multiple, wide readers to read narrow data tracks on a magnetic recording media in a storage device, according to embodiments described herein.

FIG. 2 and the following description are intended to provide a general description of a suitable environment in which the embodiments described herein may be implemented. In particular, FIG. 2 shows an illustrative storage device 200, such as an HDD apparatus, along with hardware, software and components for utilizing multiple, wide readers to read narrow data tracks on a magnetic recording media, according to the embodiments provided herein. The storage device 200 may include recording media comprising at least one platter or disk 202. The disk(s) 202 may include a magnetic recording surface divided or "formatted" into a number of individual data tracks, such as data track 104. The data tracks 104 may represent substantially concentric circular areas on the surface of the disk 202.

The storage device 200 further includes at least one read/write head 204 located adjacent to the recording surface of each disk 202. The read/write head 204 may read information from the disk 202 by sensing a magnetic field formed on portions of the surface of the disk, and may write information to the disk by magnetizing a portion of the surface of the disk. The read/write head 204 may be located at the distal end of an arm 206 that rotates in order to reposition the read/write head 204. According to embodiments, the read/write head 204 includes multiple reader elements, such as reader elements 102A-102C. The reader elements 102 may comprise magneto-resistive ("MR") readers, tunneling MR readers, or the like. It will be appreciated that the size, location, and relative orientation of the reader elements 102 shown in FIG. 2 are for illustrative purposes only, and one of ordinary skill in the art will recognize that other sizes, locations, and relative orientations are possible and part of this disclosure. According to further embodiments, at least one reader element 102 of the read/write head is wider than the width of the data tracks 104 written to the surface of the disk(s) 202. The read/write head 204 may further include other components not shown in the figure or described herein, such as writer elements, head heaters, air bearings, and the like.

The storage device 200 may further comprise a controller 220 that controls the operations of the storage device. The controller 220 may include a processor 222. The processor 222 may implement an interface 224 allowing the storage device 200 to communicate with a host device, other parts of storage device 200, or other components, such as a server computer, personal computer ("PC"), laptop, tablet, game console, set-top box or any other electronics device that can be communicatively coupled to the storage device 200 to store and retrieve data from the storage device. The processor 222 may process write commands from the host device by formatting the associated data and transfer the formatted data via a read/write channel 226 through the read/write head 204 and to the surface of the disk 202. The processor 222 may further process read commands from the host device by determining the location of the desired data on the surface of the disk 202, moving the read/write head(s) 204 over the determined location, reading the data from the surface of the disk via the read/write channel 226, correcting any errors and formatting the data for transfer to the host device.

The read/write channel 226 may convert data between the digital signals processed by the processor 222 and the analog signals conducted through the read/write head 204 for reading and writing data to the surface of the disk 202. The analog signals to and from the read/write head 204 may be further processed through a pre-amplifier circuit. The read/write channel 226 may further provide servo data read from the disk 202 to an actuator to position the read/write head 204. The read/write head 204 may be positioned to read or write data to a specific location on the on the recording surface of the disk 202 by moving the read/write head 204 radially across the data tracks 104 using the actuator while a motor rotates the disk to bring the target location under the read/write head.

According to embodiments, the controller 220 may further contain a multi-reader decoder module 108. The multi-reader decoder module 108 receives the read signals from the multiple reader elements 102 and decodes the bits of data written to the target data track 104 during a read operation. The multi-reader decoder module 108 may comprise hardware circuits in the read/write channel 226, processor-executable instructions for execution in the processor 222 or any combination of these and other components in the controller 220. The multi-reader decoder module 108 may implement the various sub components described herein for utilizing multiple, wide readers to read narrow data tracks on a magnetic recording media.

The controller 220 may further include a computer-readable storage medium or "memory" 230 for storing processor-executable instructions, data structures and other information. The memory 230 may comprise a non-volatile memory, such as read-only memory ("ROM") and/or FLASH memory, and a random-access memory ("RAM"), such as dynamic random access memory ("DRAM") or synchronous dynamic random access memory ("SDRAM"). For example, the non-volatile memory and/or the RAM may store a firmware that comprises commands and data necessary for performing the operations of the storage device 200. According to some embodiments, the memory 230 may store processor-executable instructions that, when executed by the processor, perform the routines 800 and 900 for utilizing multiple, wide readers to read narrow data tracks on a magnetic recording media of the storage device 200, as described herein.

In addition to the memory 230, the environment may include other computer-readable media storing program modules, data structures, and other data described herein for utilizing multiple, wide readers to read narrow data tracks on a magnetic recording media of the storage device 200. It will be appreciated by those skilled in the art that computer-readable media can be any available media that may be accessed by the controller 220 or other computing system for the non-transitory storage of information. Computer-readable media includes volatile and non-volatile, removable and non-removable recording media implemented in any method or technology, including, but not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

It will be appreciated that the structure and/or functionality of the storage device 200 may be different than that illustrated in FIG. 2 and described herein. For example, the processor 222, read/write channel 226, memory 230 and other components and circuitry of the storage device 200 may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the storage device 200 may not include all of the components shown in FIG. 2, may include other components that are not explicitly shown in FIG. 2 or may utilize an architecture completely different than that shown in FIG. 2.

FIG. 3 provides additional details of one system 300 for utilizing multiple, wide readers to read narrow data tracks on a magnetic recording media of a storage device. As in the illustrative system shown in FIG. 1, the system 300 of FIG. 3 includes three reader elements: two reader elements 102B and 102C that are as wide as 2x the width of the data tracks 104A-104C written to the recording media, and a third reader 102A that is 3x the track width (shown at 302). According to some embodiments, the read/write channel 226 of the storage device 208 may provide an independent signal-processing path for each of the reader elements 104A-104C. During a read operation by the storage device, each of the reader elements 102A-102C provides a read signal through signal pre-processing elements 310 of the read/write channel 226 to the multi-reader decoder module 108. The pre-processing elements 310 may include a variable-gain amplifier ("VGA"), an analog-digital converter ("ADC"), and the like.

In some embodiments, the signal from the reader element 102 may be provided to a filter 312A-312C (referred to herein generally as filter 312), such as a digital FIR filter that accounts for timing differences in the signals from the associated reader elements 102A-102C that results from passing of the stored data by the readers at different times as the disk 202 rotates underneath the read/write head 204. The filter may perform other processing of the read signals, such as mitigating noise in the signal. The filter 312 may also be referred to as an "equalizer." The signal then passes to a multi-level detector 314A-314C (referred to herein generally as multi-level detector 314) that detects multiple levels in the magnetic field on the recording surface under the associated reader (as opposed to the binary states in a traditional magnetic state detector). According to embodiments, the levels associated with data stored on a single track in a non-return to zero ("NRZ") digital magnetic recording scheme are {−1, +1}. The sign of the data may correspond to the direction of recorded media magnetization.

For each bit combination written on the three data tracks 104A-104C that pass under the three reader elements 102A-102C, the multi-level detectors 314A-314C provide multi-level triplets to a mapper 316. The mapper 316 may then utilize an appropriate algorithm to detect the data bits written to the target track, such as data track 104B, based on the multi-level triplets provided by the multi-level detectors 314A-314C. For example, TABLE 1 below provides an illustrative mapping between the multi-level triplets detected from the three reader elements 102A-102C and the bit data contained on the three data tracks 104A-104C. The bit data stored on each data track 104 will correspond to either −1 or +1, and the multi-level triplets can be seen to effectively represent a summation of the data over subsets of the three tracks, consistent with linear superposition in the readback process. Utilizing the mappings shown in TABLE 1, a simple algorithm to detect the bits in the target data track 104B (shown at $b_2$) may be implemented by the mapper 316 as follows:

$b_2=1$, if R1=2, or R2=2
$b_2=-1$, if R1=−2, or R2=−2
$b_2=1$, if R1=0 and R2=0 and R3=−1
$b_2=-1$, if R1=0 and R2=0 and R3=1

TABLE 1

| Multi-level State Mappings (3 Reader) | | | | | |
|---|---|---|---|---|---|
| R1 | R2 | R3 | $b_1$ | $b_2$ | $b_3$ |
| 2 | 2 | 3 | 1 | 1 | 1 |
| 2 | 0 | 1 | 1 | 1 | −1 |
| 0 | 0 | 1 | 1 | −1 | 1 |
| 0 | −2 | −1 | 1 | −1 | −1 |
| 0 | 2 | 1 | −1 | 1 | 1 |
| 0 | 0 | −1 | −1 | 1 | −1 |
| −2 | 0 | −1 | −1 | −1 | 1 |
| −2 | −2 | −3 | −1 | −1 | −1 |

The output from the mapper 316 may then be passed to a conventional channel decoder 318 to decode the user data from the target data track 104. It will be appreciated that this example detection algorithm utilizing independent multi-level detectors 314 for each reader is only for illustrative purposes and is not intended to represent an optimal solution. Better detection algorithms or methods may be designed by jointly processing the three reader signals to yield the data for the target data track 104B. For example, the multi-reader decoder module 108 may utilize a simple lookup in a mapping table stored in the memory 230 or other storage area containing the mappings depicted in TABLE 1 to convert the multi-level triplets to the data (b2) of the target data track 104B. It is intended that all such detection algorithms be included in this application. It will be further appreciated that in the example system 300 shown in FIG. 3, there is no implicit mapping rate loss, and the storage device 200 can employ a conventional write process, i.e., writing each track independently, thus not affecting the write performance of the device.

FIG. 4 shows aspects of another illustrative system 400 for utilizing multiple, wide readers to read narrow data tracks on a magnetic recording media of a storage device. In order to reduce the number of reader elements, hence the system cost, the read/write head 204 of the system 400 depicted in FIG. 4 incorporates only two reader elements 102A and 102B. According to some embodiments, both of the reader elements 102A and 102B are 2x the width of the written data tracks 104A-104C on the storage media.

As in the system 300 shown in FIG. 3, the multi-level detectors 314 detect multiple levels under each reader element 102A-102B and the multi-level detectors 314A-314B provide multi-level pairs to the mapper 316. The mapper 316 then utilizes the appropriate algorithm to detect the data bits written to the target track, such as data track 104B, based on the multi-level pairs provided by the multi-level detectors 314. For example, TABLE 2 below provides an illustrative mapping table mapping the multi-level pairs detected from the two reader elements 102A and 102B to the bit data contained on the three data tracks 104A-104C. Utilizing the mappings shown in TABLE 2, a simple algorithm to detect the bits in the target data track 104B (shown at $b_2$) may be implemented by the mapper 316 as follows:

$b_2$=1, if R1=2, or R2=2
$b_2$=−1, if R1=−2, or R2=−2
$b_2$=1, if R1=0 and R2=0 and $b_2$ is on an even track
$b_2$=−1, if R1=0 and R2=0 and $b_2$ is on an odd track

TABLE 2

Multi-level State Mapping Table (2 Reader)

|    | R1 | R2 | $b_1$ | $b_2$ | $b_3$ |
|----|----|----|----|----|----|
|    | 2  | 2  | 1  | 1  | 1  |
|    | 2  | 0  | 1  | 1  | −1 |
| >> | 0  | 0  | 1  | −1 | 1  |
|    | 0  | −2 | 1  | −1 | −1 |
|    | 0  | 2  | −1 | 1  | 1  |
| >> | 0  | 0  | −1 | 1  | −1 |
|    | −2 | 0  | −1 | −1 | 1  |
|    | −2 | −2 | −1 | −1 | −1 |

However, because of the lack of the third reader, two different bit patterns across the three data tracks 104A-104C maps to the same pair of multi-level values, specifically (0, 0), as shown in TABLE 2. This may create a problem for the detection algorithm utilized by the mapper 316. One approach to dealing with this problem is to eliminate one of the patterns when writing data to the storage media that contributes to the redundant multi-level pair. In some embodiments, a two-dimensional ("2-D") modulation-coding scheme may be implemented for this purpose, designed to eliminate the (1, −1, 1, −1, . . . ) pattern in the cross-track direction. However, since one of the eight patterns is eliminated, the best coding rate for such a 2-D modulation-coding scheme would be ⅞, which results in a loss in a ⅛ loss in overall storage capacity. Also, in order to implement the 2-D modulation coding scheme, the controller 220 must know the patterns written at adjacent tracks, such as tracks 104A and 104B, when writing data to data track 104C, which may require additional buffers and other components to implement the write process.

The use of the 2-D modulation-coding scheme may also affect write performance of the storage device 200. In order to make sure the performance effect is minimized, the controller 220 may store the previous two tracks of written information in a buffer and as the third track of data is being received and use the buffered data for data tracks 104A and 104B to jointly encode the data to be written to the third data track 104C. Upon completing the write of the third data track 104C, the controller 220 may then shift the tracks down in the buffer to allow for encoding of the next track.

Figure 5:
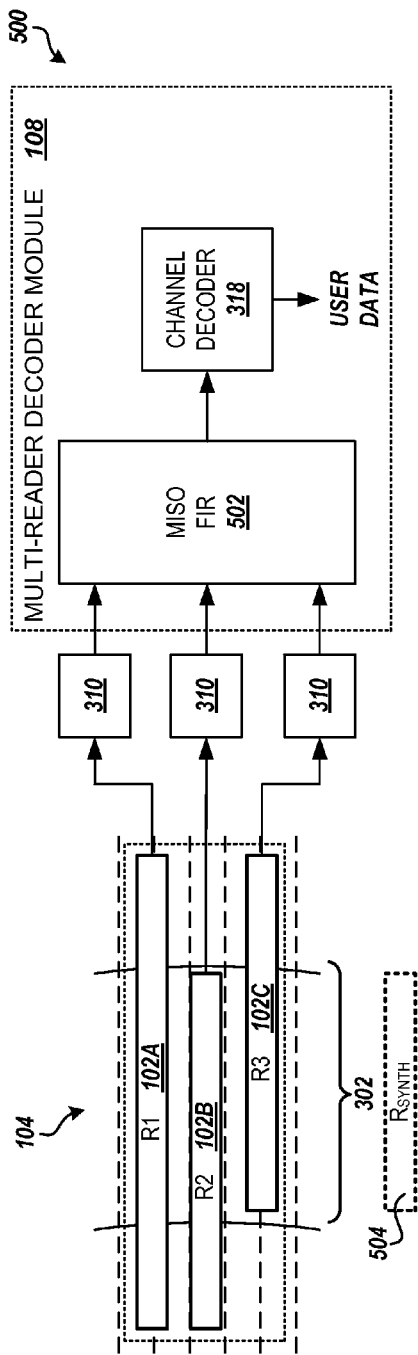

FIG. 5 shows aspects of another illustrative system 500 for utilizing multiple, wide readers to read narrow data tracks on a magnetic recording media of a storage device. The system 500 of FIG. 5 includes three reader elements 102A-102C as in the example shown in FIG. 3. However, in this example the width of the written track (shown at 302) is closer to the width of the readers. For example, for a track width 302 of substantially 25 nm, the width of reader element R1 102A may be approximately 40 nm, while the widths of readers R2 102B and R3 102C may be approximately 30 nm. The left edges of reader elements R2 102B and R3 102C may be offset from the left edge of reader R1 102A by 0 nm and 10 nm, respectively, while the right edges of reader elements R2 102B and R3 102C may be offset from the right edge of reader R1 102A by 10 nm and 0 nm, respectively.

According to some embodiments, the read signals from the reader elements 102A-102C may pass through the signal pre-processing elements 310 to the multi-reader decoder module 108. The signals may then be provided to a multiple-input single-output ("MISO") filter 502, such as a finite impulse response ("FIR") filter. The MISO filter 502 may account for phase differences in the signals from the associated reader elements 102A-102C as well as mitigating noise in the signals. The MISO FIR filter 502 may further be configured to combine the read signals from the reader elements 102A-102C to generate a synthesized readback signal. For example, a simple combining rule such as $y_{SYNTH}=y_{R2}+y_{R3}-y_{R1}$ (where $y_{RN}$ is the readback signal from the Nth reader) may be implemented to produce a synthesized readback signal $y_{SYNTH}$ that approximates the signal generated from a narrower reader $R_{SYNTH}$, as shown at 504. The synthesized readback signal $y_{SYNTH}$ would further have a better SNR than the signals from the individual readers.

According to the reader dimensions above, for example, the width of $R_{SYNTH}$ 504 would be approximately 20 nm—appropriate for reading the 25 nm data track 104. Adapting this scheme to a more general case where the three reader widths are $W_{R1}$, $W_{R2}$, and $W_{R3}$, utilizing the same combining rule above would result in a synthesized readback signal $y_{SYNTH}$ that approximates the signal generated from a reader $R_{SYNTH}$ of width $W_{R2}-W_{R3}-W_{R1}$. The offsets for reader elements R2 102B and R3 102C may be derived from the difference in their respective read-widths to reader element R1 102A. The synthesized combined signal $y_{SYNTH}$ may then be fed by the MISO filter 502 to a conventional channel decoder 318 in order to decode the user data from the target data track 104.

The system 500 shown in FIG. 5 relies on linear superposition in the readback process. However, since MR heads are not perfectly linear and generally suffer from processing variations that lead to differences in dimensions and signal characteristics (amplitude, readback noise, etc.), the MISO filter 502 and/or other components of the read/write channel 226 may further be configured to compensate for the behavioral differences between the various reader elements 102 utilized in the system 500, so that signal combining may be performed as close to optimal as possible.

Figure 6:
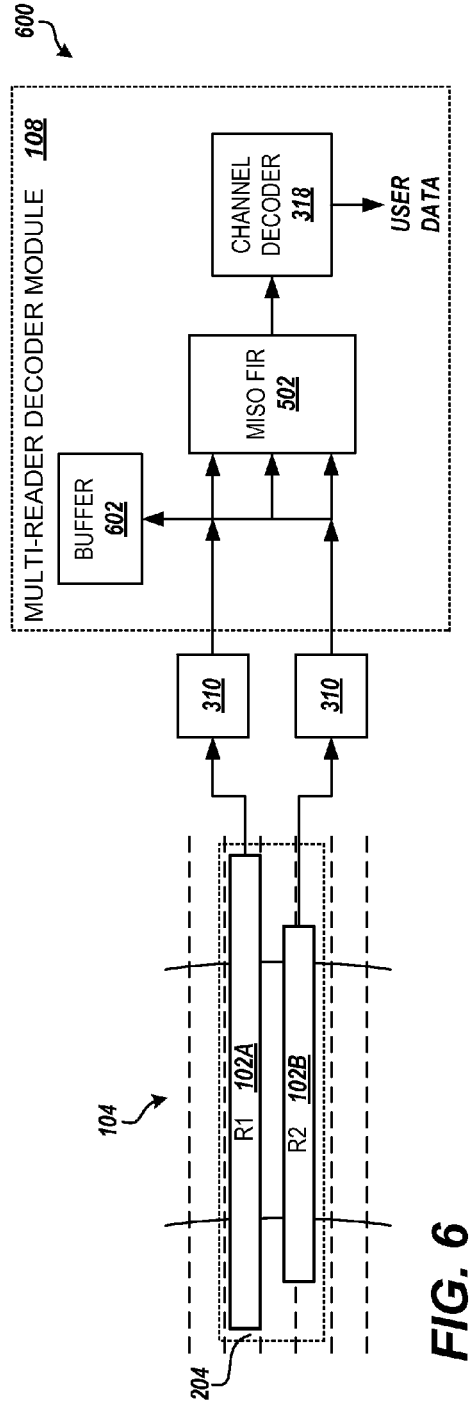

The system 500 depicted in FIG. 5 also assumes that the three reader elements 102A-102C are reading the data track 104 in real-time (meaning, for example, that the three reader elements are located on a read/write head 204 at a near-optimal position). The synthesized combined signal $y_{SYNTH}$ would also be generated by the MISO filter 502 in real-time. FIG. 6 provides details of another system 600 for utilizing multiple, wide readers to read narrow data tracks that doesn't require this real-time restriction. The system 600 of FIG. 6 includes only two reader elements 102A and 102B located on the read/write head 204 with different widths. For examples, the two reader elements 102A and 102B may have read widths of 40 nm and 30 nm respectively. The two reader elements 102A and 102B may further be centrally aligned with each other in the cross-track direction.

Figure 7:
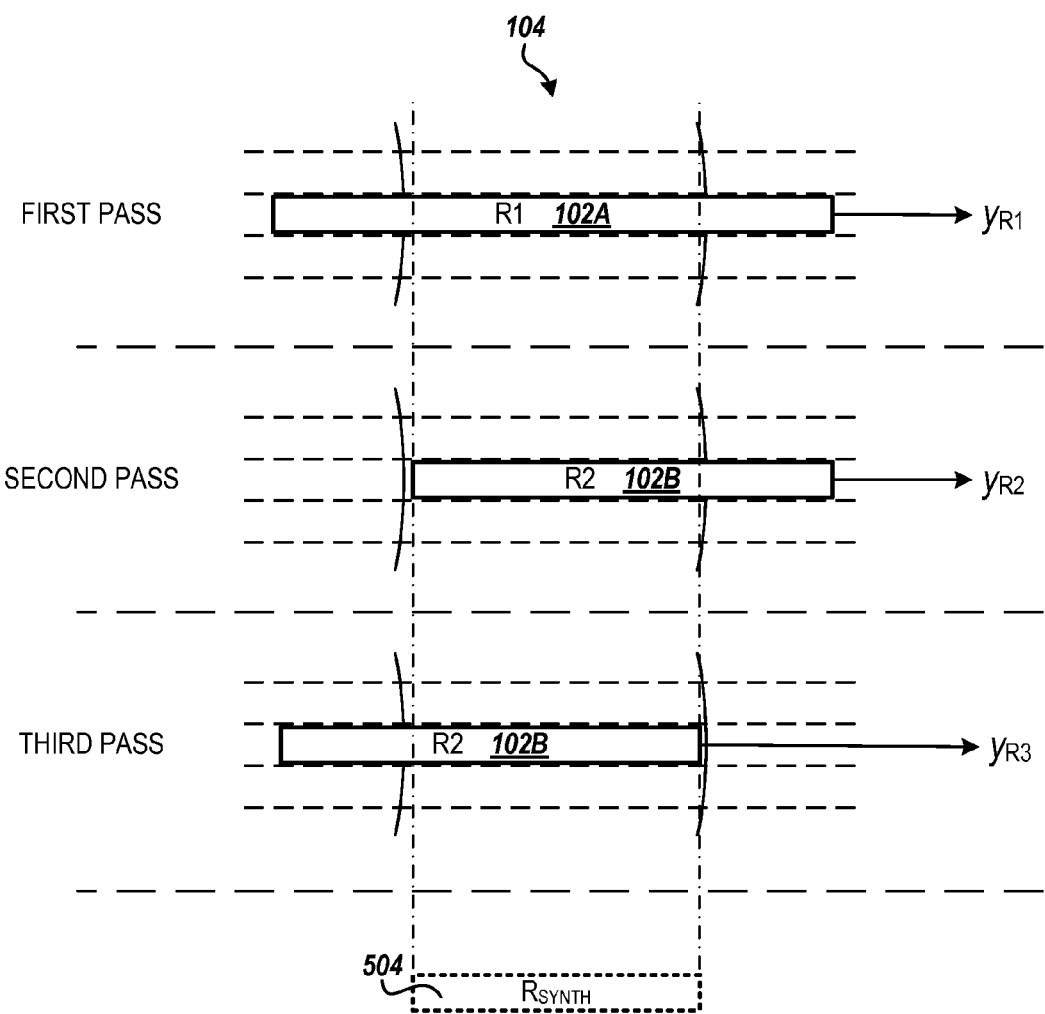
FIG. 7 is a block diagram showing further aspects of systems for reading data from a data track utilizing multiple wide readers in multiple passes, according to embodiments described herein.

The system 600 relies on multiple passes of the read/write head 204 over the data on the data track 104 in order to perform the read. The three read signals $y_{R1}$, $y_{R2}$, and $y_{R3}$ from each reader element 102 are obtained in separate passes by positioning the appropriate reader of the two reader elements 102A and 102B in the appropriate position over the data track 104 being read, as shown in FIG. 7. The read signals from the first two passes may be buffered in a buffer 602 implemented by the multi-reader decoder module 108 or another component of the controller 220 and then combined with the read signal from the final pass using the same combining rule described above to produce the synthesized readback signal $y_{SYNTH}$ approximating reader $R_{SYNTH}$ 504, as further shown in FIG. 7. In other embodiments, the buffer 602 may buffer intermediate applications of the combiner rule to be combined with the subsequent read signal on the next pass.

As in the system 500 described above in regard to FIG. 5, the synthesized combined signal $y_{SYNTH}$ may then be fed by the MISO filter 502 to the conventional channel decoder 318 in order to decode the data from the target data track 104 in conjunction with the last read pass. Because the system 600 relies on multiple passes to perform the read, the system 600 may be employed by the storage device 200 for performing read-retries when an initial, single-pass read operation of the data track 104 fails, according to some embodiments.

Figure 8:
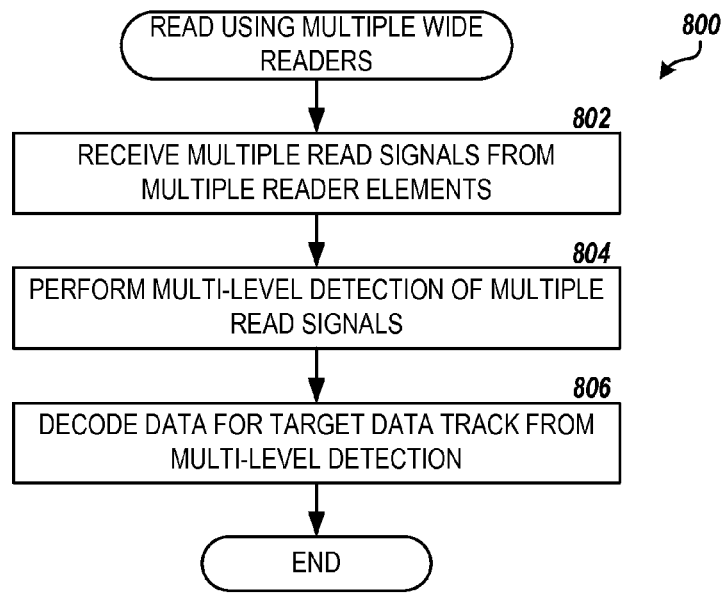
FIG. 8 is a flow diagram showing one routine for reading data from a data track utilizing multiple, wide readers, according to embodiments described herein.

FIG. 8 illustrates one routine 800 for utilizing multiple, wide readers to read narrow data tracks on a magnetic recording media, according to some embodiments. The routine 800 may be performed by storage devices 200 implementing the systems 300 and 400 described above in regards to FIGS. 3 and 4. According to embodiments, the routine 800 may be performed by the multi-reader decoder module 108 of a storage device 200 during a read of a target data track 104B. In further embodiments, the routine 800 may be performed by the controller 220 of the storage device 200, by external processors or computing systems performing storage processing in the storage device, or some other combination of modules, processors and devices.

The routine 800 begins at step 802, where the multi-reader decoder module 108 receives the read signals from multiple reader elements 102. For example, the multi-reader decoder module 108 may receive the read signals $y_{R1}$, $y_{R2}$ and $y_{R3}$ from the reader elements 102A, 102B, and 102C depicted in FIG. 3, respectively. The read signals may be processed through pre-processing components 310 of the read/write channel 226 before being received by the multi-reader decoder module 108, according to some embodiments.

From step 802, the routine 800 proceeds to step 804, where the multi-reader decoder module 108 performs multi-level detection on the read signals. According to some embodiments, the multi-reader decoder module 108 may perform multi-level detection on each of the read signals from the reader elements 102 independently, using separate multi-level detectors 314. In further embodiments, the multi-reader decoder module 108 may process each of the read signals through an independently configured filter 312 in order to account for phase differences in the signals from the associated reader elements 102 that results from the data on the target data track 104B passing by the readers at different times as the disk 202 rotates underneath the read/write head 204. The filters 312 may further mitigate noise in the signals.

From step 804, the routine 800 proceeds to step 806, where the multi-reader decoder module 108 decodes the data from the target data track 104B based on the multi-level detection of the read signals performed in step 804. For example, the multi-reader decoder module 108 may utilize a mapper 316 to detect the bits in the target data track 104B based on the multi-level triplets from the multi-level detectors 314 utilizing any of the algorithms described above in regard to FIG. 3 or 4. The detected bits may then be sent to conventional channel decoder(s) 318 to decode the user data. From step 806, the routine 800 ends.

Figure 9:
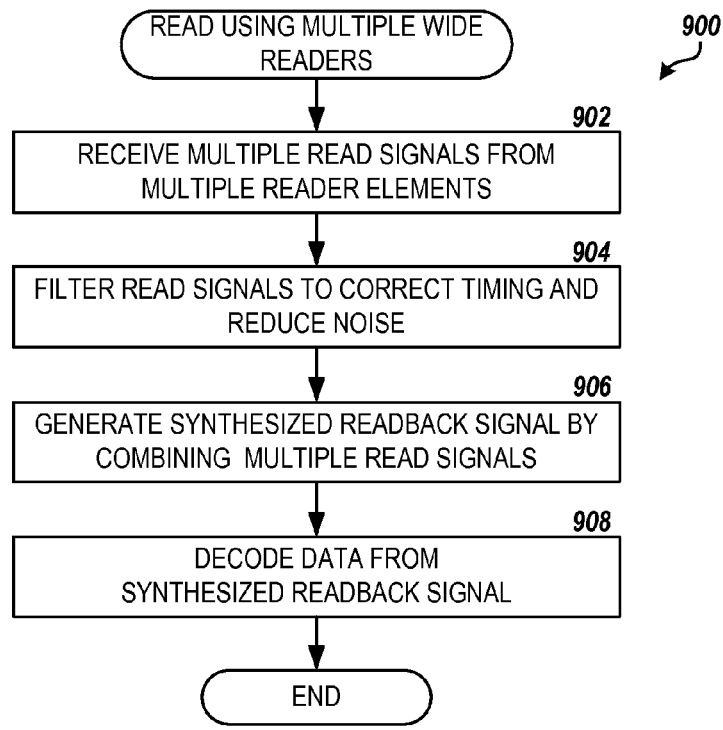
FIG. 9 is a flow diagram showing another routine for reading data from a data track utilizing multiple, wide readers, according to embodiments described herein.

FIG. 9 illustrates another routine 900 for utilizing multiple, wide readers to read narrow data tracks on a magnetic recording media, according to some embodiments. The routine 900 may be performed by storage devices 200 implementing the systems 500 and 600 described above in regards to FIGS. 5 and 6. According to embodiments, the routine 900 may be performed by the multi-reader decoder module 108 of a storage device 200 during a read of a target data track 104. In further embodiments, the routine 900 may be performed by the controller 220 of the storage device 200, by external processors or computing systems performing storage processing in the storage device, or some other combination of modules, processors and devices.

The routine 900 begins at step 902, where the multi-reader decoder module 108 receives the read signals from multiple reader elements 102. For example, the multi-reader decoder module 108 may receive the read signals $y_{R1}$, $y_{R2}$ and $y_{R3}$ from the reader elements 102A, 102B, and 102C depicted in FIG. 5, respectively. The read signals may be processed through pre-processing components 310 of the read/write channel 226 before being received by the multi-reader decoder module 108, according to some embodiments. In further embodiments, the read signals may be received over multiple passes of the read/write head 204 over the data on the target data track 104. The read signals from preceding passes may be buffered in a buffer 602 of the multi-reader decoder module 108 to be utilized during the final pass.

From step 902, the routine 900 proceeds to step 904, where the multi-reader decoder module 108 filters the read signals to mitigate noise in the signal and/or account for phase differences in the signals from the associated reader elements 102 that results from the data on the target data track 104 passing by the readers at different times as the disk 202 rotates underneath the read/write head 204. The filtering may be performed by the MISO FIR filter 502, according to some embodiments.

The routine 900 proceeds from step 904 to step 906, where the multi-reader decoder module 108 generates a synthesized readback signal by combining the filtered read signals from the multiple reader elements 102. According to some embodiments, in the case of the systems 500 and 600 with three read signals $y_{R1}$, $y_{R2}$, and $y_{R3}$, a simple combining rule such as $y_{SYNTH} = y_{R2} + y_{R3} - y_{R1}$ may be utilized to generate the synthesized readback signal $y_{SYNTH}$ approximating the signal generated from a narrower reader $R_{SYNTH}$ 504. The combining rule may be implemented in the MISO filter 502 or some other component of the multi-reader decoder module 108. In some embodiments, one or more of the signals $y_{R1}$, $y_{R2}$ and $y_{R3}$ may be read by the MISO filter 502 from the buffer 602 during the combining function.

From step 906, the routine 900 proceeds to step 908, where the multi-reader decoder module 108 decodes the data on the target data track 104 from the synthesized readback signal. For example, the synthesized combined signal $y_{SYNTH}$ may be fed to a conventional channel decoder 318 in order to decode the data from the target data track 104. From step 908, the routine 900 ends.

Based on the foregoing, it will be appreciated that technologies for utilizing multiple, wide readers to read narrow data tracks on a magnetic recording media are presented herein. It will be appreciated that the number, widths, alignment, and configuration of the reader elements 102 in the systems shown in the figures and described herein are for illustrative purposes only. Systems may be implemented with two, three, or more reader elements 102 of varying widths or the same width may be utilized to read the narrow data tracks 104 of the storage device 200 utilizing the methods and apparatuses described herein. In some embodiments, each of the reader elements 102 may have a width of an integer multiple of the width of a data track 104 written to the recording media. In further embodiments, at least one reader element 102 may be wider than the width of a data track 104. In still further embodiments, the reader elements 102 may be aligned on-centers on the read/write head 204.

Further, the read/write channel 226 of the controller 220 may contain any number of read channels and components to support the multiple reader elements 102. It is intended that this application include all such combinations of reader counts, widths, and configurations and all supporting channel configurations. While embodiments are described herein in regard to an HDD device, it will also be appreciated that the embodiments described in this disclosure may be utilized to read data in any storage device containing data stored in substantially parallel or substantially concentric tracks on a magnetic recording media, including but not limited to, a magnetic disk drive, a hybrid magnetic and solid state drive, a magnetic tape drive and the like. The above-described embodiments are merely possible examples of implementations, merely set forth for a clear understanding of the principles of the present disclosure.

The logical operations, functions or steps described herein as part of a method, process or routine may be implemented (1) as a sequence of processor-implemented acts, software modules or portions of code running on a controller or computing system and/or (2) as interconnected machine logic circuits or circuit modules within the controller or computing system. The implementation is a matter of choice dependent on the performance and other requirements of the system. Alternate implementations are included in which operations, functions or steps may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features and aspects discussed above. All such modifications and variations are intended to be included herein within the scope of the present disclosure, and all possible claims to individual aspects or combinations of elements or steps are intended to be supported by the present disclosure.

What is claimed is:

1. A system for reading a data track on magnetic recording media, the system comprising:
   a read/write head comprising a plurality of reader elements configured to read a magnetic signal from the magnetic recording media, at least one of the plurality of reader elements being wider than a width of the data track on the recording media;
   a multi-level detector coupled to each of the plurality of reader elements and configured to detect multiple levels in the magnetic signal from the corresponding reader element and generate an associated multi-level value; and
   a mapper coupled to the multi-level detectors and configured to map the multi-level values from the multi-level detectors to bit data stored on the data track.

2. The system of claim 1, wherein the magnetic signals indicate a summation of data on the data track and one or more adjacent tracks.

3. The system of claim 1, wherein each of the plurality of reader elements has a different alignment over the data track.

4. The system of claim 1, further comprising a plurality of filters configured to account for phase differences in the magnetic signals from the plurality of reader elements.

5. The system of claim 1, wherein the plurality of reader elements comprises three reader elements, the width of each of the reader elements being an integer greater than 1 multiple of the width of the data track.

6. The system of claim 1, wherein the plurality of reader elements comprises two reader elements, each of the two reader elements being substantially two times the width of the data track.

7. The system of claim 1, wherein the plurality of reader elements are centrally-aligned with each other in a cross-track direction on the read/write head.

8. The system of claim 1, further comprising a buffer configured to buffer the magnetic signals from one or more of the plurality of reader elements and wherein reading the data on the data track require multiple passes of the data on the magnetic recording media beneath the read/write head.

9. The system of claim 1, wherein the multi-level detectors and the mapper are contained in a controller configured to control a data storage device.

10. A method for reading a target data track on a recording media, the method comprising steps of:
    receiving a read signal from each of a plurality of reader elements, the read signal indicating a summation of data on the target data track and one or more adjacent tracks, at least one of the plurality of reader elements being wider than the target data track on the recording media;
    detecting a multi-level value from each of the read signals, the multi-level value indicating a level of a magnetic field on a surface of the recording media under the associated reader element; and
    mapping the multi-level values to bit data stored on the target data track.

11. The method of claim 10, wherein the plurality of reader elements comprises three reader elements, two of the three reader elements being substantially two times the width of the target data track and the third of the three reader elements being substantially three times the width of the target data track.

12. The method of claim 10, wherein the plurality of reader elements comprises two reader elements centrally-aligned with each other in a cross-track direction on a read/write head.

13. A read/write channel of a hard-disk drive ("HDD") device comprising:
    a plurality of multi-level detectors, each of the multi-level detectors configured to detect multiple levels in read signals from a plurality of reader elements and generate an associated multi-level value, at least one of the plurality of reader elements being wider than data tracks written to a recording media of the HDD device; and
    a mapper configured to map the multi-level values from the plurality of multi-level detectors to bit data stored on a target data track on the recording media.

14. The read/write channel of claim 13, wherein the read signals indicate a summation of data on the target data track and one or more adjacent tracks.

15. The read/write channel of claim 13, further comprising a plurality of filters configured to account for phase differences in the read signals from the plurality of reader elements.

* * * * *